(12) United States Patent
Kessler

(10) Patent No.: US 6,567,900 B1
(45) Date of Patent: May 20, 2003

(54) EFFICIENT ADDRESS INTERLEAVING WITH SIMULTANEOUS MULTIPLE LOCALITY OPTIONS

(75) Inventor: Richard E. Kessler, Shrewsbury, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 283 days.

(21) Appl. No.: 09/652,452

(22) Filed: Aug. 31, 2000

(51) Int. Cl.[7] .............................................. G06F 12/00

(52) U.S. Cl. ...................... 711/157; 711/148; 711/202; 711/217; 711/220

(58) Field of Search ................................ 709/212–216, 709/245; 711/5–6, 147–148, 153, 200, 202, 157; 712/7, 14

(56) References Cited

U.S. PATENT DOCUMENTS

| 5,261,066 A | 11/1993 | Jouppi et al. ............... 395/425 |
| 5,317,718 A | 5/1994 | Jouppi ......................... 395/425 |
| 5,758,183 A | 5/1998 | Scales .......................... 395/825 |
| 5,761,729 A | 6/1998 | Scales .......................... 711/148 |
| 5,784,706 A * | 7/1998 | Oberlin et al. .............. 711/202 |
| 5,787,480 A | 7/1998 | Scales et al. ................. 711/148 |
| 5,802,585 A | 9/1998 | Scales et al. ................. 711/154 |
| 5,809,450 A | 9/1998 | Chrysos et al. ............. 702/186 |
| 5,875,151 A | 2/1999 | Mick ............................ 365/233 |
| 5,887,146 A * | 3/1999 | Baxter et al. ................ 709/400 |
| 5,890,201 A | 3/1999 | McLellan et al. ........... 711/108 |
| 5,893,931 A | 4/1999 | Peng et al. ................... 711/206 |
| 5,918,250 A | 6/1999 | Hammond ................... 711/205 |
| 5,918,251 A | 6/1999 | Yamada et al. .............. 711/207 |
| 5,923,872 A | 7/1999 | Chrysos et al. ............. 395/591 |
| 5,950,228 A | 9/1999 | Scales et al. ................. 711/148 |
| 5,964,867 A | 10/1999 | Anderson et al. ........... 712/219 |
| 5,983,325 A | 11/1999 | Lewchuk .................... 711/137 |
| 6,000,044 A | 12/1999 | Chrysos et al. ............. 714/47 |
| 6,070,227 A | 5/2000 | Rokicki ....................... 711/117 |
| 6,085,300 A | 7/2000 | Sunaga et al. ............... 711/168 |
| 6,128,639 A * | 10/2000 | Pase ............................ 708/502 |
| 6,286,090 B1 * | 9/2001 | Steely et al. ................. 711/152 |
| 6,351,798 B1 * | 2/2002 | Aono ........................... 709/248 |
| 6,353,877 B1 * | 3/2002 | Duncan et al. .............. 710/306 |

OTHER PUBLICATIONS

*Alpha Architecture Reference Manual*, Third Edition, The Alpha Architecture Committee, 1998 Digital Equipment Corporation (21 p.), in particular pp. 3–1 through 3–15.

*A Logic Design Structure For LSI Testability*, E. B. Eichelberger et al., 1977 IEEE (pp. 462–468).

(List continued on next page.)

Primary Examiner—Matthew Kim
Assistant Examiner—Woo H. Choi

(57) ABSTRACT

A computer system includes multiple processors, each of which includes an associated memory. Each of the processors is capable of accessing the memory of all other processors. Memory can be stored and accessed using different addressing schemes. For data that will only be used by the local processor, data is stored in memory using processor contiguous addressing, so that data is stored in the local memory. For data that may be accessed by multiple processors, data is stored using striping among a local processor set. A stripe control register in the memory controller of each memory comprises a mask that indicates which memory blocks should be accessed using processor contiguous addressing and which should be accessed by using striped addressing. For both striped and contiguous addressing, the address space includes a processor identification field to identify the processor where the associated memory resides, together with an offset indicating where in memory the address is located. The processor identification field for striped addressing includes two bits located in low order address space identifying a four processor local stripe set. The other processor identification bits define which four processors comprise each stripe set.

29 Claims, 5 Drawing Sheets

| 43 42 | | 37 36 | 35 34 33 | | 7 6 5 | | 0 |
|---|---|---|---|---|---|---|---|
| 0 | PID (7:2) | 0 | PID (1:0) | OFFSET | PORT | CACHE ALIGNMENT | |

| 43 42 | | 37 36 | 35 | | 9 8 | 7 6 5 | | 0 |
|---|---|---|---|---|---|---|---|---|
| 0 | PID (7:2) | 1 | OFFSET | PID (1:0) | PORT | CACHE ALIGNMENT | | |

OTHER PUBLICATIONS

*Direct RDRAM™ 256/288–Mbit (512Kx16/18x32s)*, Preliminary Information Document DL0060 Version 1.01 (69 p.).

*Testability Features of AMD–K6™ Microprocessor*, R. S. Fetherston et al., Advanced Micro Devices (8 p.).

*Hardware Fault Containment in Scalable Shared–Memory Multiprocessors*, D. Teodosiu et al., Computer Systems Laboratory, Stanford University (12 p.), 1977.

*Cellular Disco: resource management using virtual clusters on shared–memory multiprocessors*, K. Govil et al., 1999 ACM 1–58113–140–2/99/0012 (16 p.).

*Are Your PLDs Metastable?*, Cypress Semiconductor Corporation, Mar. 6, 1997 (19 p.).

*Rambus® RIMM™Module (with 128/144Mb RDRAMs)*, Preliminary Information, Document DL0084 Version 1.1 (12 p.).

*Direct Rambus™RIMM ™Module Specification Version 1.0*, Rambus Inc., SL–0006–100 (32 p.), 2000.

*End–To–End Fault Containment In Scalable Shared–Memory Multiprocessors*, D. Teodosiu, Jul. 2000 (148 p.).

U.S. patent application Ser. No. 09/653,942, filed Aug. 31, 2000, Apparatus And Method For Interfacing A High Speed Scan–Path With Slow–Speed Test Equipment.

U.S. patent application Ser. No. 09/652,322, filed Aug. 31, 2000, Priority Rules For Reducing Network Message Routing Latency.

U.S. patent application Ser. No. 09/652,703, filed Aug. 31, 2000, Scalable Directory Based Cache Coherence Protocol.

U.S. patent application Ser. No. 09/652,391, filed Aug. 31, 2000, Scalable Efficient I/O Port Protocol.

U.S. patent application Ser. No. 09/652,552, filed Aug. 31, 2000, Efficient Translation Lookaside Buffer Miss Processing In Computer Systems With A Large Range Of Page Sizes.

U.S. patent application Ser. No. 09/651,949, filed Aug. 31, 2000, Fault Containment And Error Recovery Techniques In A Scalable Multiprocessor.

U.S. patent application Ser. No. 09/652,834, filed Aug. 31, 2000, Speculative Directory Writes in A Directory Based Cache Coherent Nonuniform Memory Access Protocol.

U.S. patent application Ser. No. 09/652,314, filed Aug. 31, 2000, Special Encoding Of Known Bad Data.

U.S. patent application Ser. No. 09/652,165, filed Aug. 31, 2000, Broadcast Invalidate Scheme.

U.S. patent application Ser. No. 09/652,704, filed Aug. 31, 2000, Mechanism To Track All Open Pages In A DRAM Memory System.

U.S. patent application Ser. No. 09/653,093, filed Aug. 31, 2000, Programmable DRAM Address Mapping Mechanism.

U.S. patent application Ser. No. 09/652,323, filed Aug. 31, 2000, Computer Architecture And System For Efficient Management Of Bi–Directional Bus.

U.S. patent application Ser. No. 09/653,092, filed Aug. 31, 2000, A High Performance Way Allocation Strategy For A Multi–Way Associative Cache System.

U.S. patent application Ser. No. 09/651,948, filed Aug. 31, 2000, Method And System For Absorbing Defects In High Performance Microprocessor With A Large N–Way Set Associative Cache.

U.S. patent application Ser. No. 09/652,324, filed Aug. 31, 2000, A Method For Reducing Directory Writes And Latency In A High Performance, Directory–Based, Coherency Protocol.

U.S. patent application Ser. No. 09/653,094, filed Aug. 31, 2000, Methanism To Reorder Memory Read And Write Transactions For Reduced Latency And Increased Bandwidth.

U.S. patent application Ser. No. 09/652,325, filed Aug. 31, 2000, System For Minimizing Memory Bank Conflicts In A Computer System.

U.S. patent application Ser. No. 09/651,945, filed Aug. 31, 2000, Computer Resource Management And Allocation System.

U.S. patent application Ser. No. 09/653,643, filed Aug. 31, 2000, Input Data Recovery Scheme.

U.S. patent application Ser. No. 09/652,451, filed Aug. 31, 2000, Fast Lane Prefetching.

U.S. patent application Ser. No. 09/652;480, filed Aug. 31, 2000, Mechanism For Synchronizing Multiple Skewed Source–Synchronous Data Channels With Automatic Initialization Feature.

U.S. patent application Ser. No. 09/651,924, filed Aug. 31, 2000, Mechanism To Control The Allocation Of An N–Source Shared Buffer.

U.S. patent application Ser. No. 09/652,315, filed Aug. 31, 2000, Chaining Directory Reads And Writes To Reduce DRAM Bandwidth In A Directory Based CC–NUMA Protocol.

\* cited by examiner

FIG.4a

| 43 42 | 37 36 35 34 33 | | 7 6 5 | 0 |
|---|---|---|---|---|
| 0 | PID (7:2) | 0 | PID (1:0) | OFFSET | PORT | CACHE ALIGNMENT |

FIG.4b

| 43 42 | 37 36 35 | | 9 8 7 6 5 | 0 |
|---|---|---|---|---|
| 0 | PID (7:2) | 1 | OFFSET | PID (1:0) | PORT | CACHE ALIGNMENT |

EFFICIENT ADDRESS INTERLEAVING WITH SIMULTANEOUS MULTIPLE LOCALITY OPTIONS

CROSS-REFERENCE TO RELATED APPLICATIONS

This application relates to the following commonly assigned co-pending applications entitled:

"Apparatus And Method For Interfacing A High Speed Scan-Path With Slow-Speed Test Equipment," Ser. No. 09/653,642, filed Aug. 31, 2000, "Priority Rules For Reducing Network Message Routing Latency," Ser. No. 09/652,322, filed Aug. 31, 2000, "Scalable Directory Based Cache Coherence Protocol," Ser. No. 09/652,703, filed Aug. 31, 2000, "Scalable Efficient I/O Port Protocol," Ser. No. 09/652,391, filed Aug. 31, 2000, "Efficient Translation Lookaside Buffer Miss Processing In Computer Systems With A Large Range Of Page Sizes," Ser. No. 09/652,552, filed Aug. 31, 2000,: "Fault Containment And Error Recovery Techniques In A Scalable Multiprocessor," Ser. No. 09/651,949, filed Aug. 31, 2000, "Speculative Directory Writes In A Directory Based Cache Coherent Nonuniform Memory Access Protocol," Ser. No. 09/652,834, filed Aug. 31, 2000, "Special Encoding Of Known Bad Data," Ser. No. 09/652,314, filed: Aug. 31, 2000, "Broadcast Invalidate Scheme," Ser. No. 09/652,165, filed Aug. 31, 2000, "Mechanism To Track All Open Pages In A DRAM Memory System," Ser. No. 09/652,704, filed Aug. 31, 2000, "Programmable DRAM Address Mapping Mechanism," Ser. No. 09/653,093, filed Aug. 31, 2000, "Computer Architecture And System For Efficient Management Of Bi-Directional Bus," Ser. No. 09/652,323, filed Aug. 31, 2000, "A High Performance Way Allocation Strategy For A Multi-Way Associative Cache System," Ser. No. 09/653,092, filed Aug. 31, 2000, "Method And System For Absorbing Defects In High Performance Microprocessor With A Large N-Way Set Associative Cache," Ser. No. 09/651,948, filed Aug. 31, 2000, "A Method For Reducing Directory Writes And Latency In A High Performance, Directory-Based, Coherency Protocol," Ser. No. 09/652,324, filed Aug. 31, 2000, "Mechanism To Reorder Memory Read And Write Transactions For Reduced Latency And Increased Bandwidth," Ser. No. 09/653,094, filed Aug. 31, 2000, "System For Minimizing Memory Bank Conflicts In A Computer System," Ser. No. 09/652,325, filed Aug. 31, 2000, "Computer Resource Management And Allocation System," Ser. No. 09/651,945, filed Aug. 31, 2000, "Input Data Recovery Scheme," Ser. No. 09/653,643, filed Aug. 31, 2000, "Fast Lane Prefetching," Ser. No. 09/652,451, filed Aug. 31, 2000, "Mechanism For Synchronizing Multiple Skewed Source-Synchronous Data Channels With Automatic Initialization. Feature," Ser. No. 09/652,480, filed Aug. 31, 2000, "Mechanism To Control The Allocation Of An N-Source Shared Buffer," Ser. No. 09/651,924, filed Aug. 31, 2000, and "Chaining Directory Reads And Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to a computer system that includes a plurality of microprocessors. More particularly, the invention relates to a multiple processor computer system with distributed memory sub-systems accessible by the processors in the system. Still more particularly, the present invention relates to an improved system and method that supports multiple address interleaving techniques that can be active simultaneously to reduce latency and increase memory bandwidth.

2. Background of the Invention

One of the basic issues in any computer system is determining the most efficient technique to address the various memory devices that are present in the system. The memory in a computer system stores data and instructions for subsequent retrieval and use by the processor and other components in the computer system. To facilitate the storage, retrieval and subsequent use of they data and instructions, the processor and other computer system components must be able to identify the address of the stored data. Typically, the computer system implements a defined protocol for assigning addresses to stored data. Whenever data is written or read from memory, the component requesting the transaction transmits an address signal or command to the memory identifying where the data should be written, or conversely, from where the data should be read. The memory typically has an associated memory controller that includes an address decoder that decodes the bits in the address signal to determine the location within memory being accessed. In a conventional memory system, this includes identifying the page of memory, and within the page, the row and column of the data being written or read. The particular coding in the address signal or command typically identifies the starting address of a particular memory device, while other bits identify the offset within the memory device where the particular access is targeted.

When data is written into memory, typically continuous memory addresses are used to identify contiguous memory locations. Thus, for example, the address 8001 will be followed by address 8002 (both of which would be written in binary format) to identify adjacent memory locations within a page of memory. More recently, it has become commonplace to include banks of memory within a computer system, so that a conventional personal computer system may include a single processor with multiple memory banks accessible via different memory ports. Some or all of the memory banks may be populated with some form of dynamic random access memory ("DRAM"). In systems with multiple memory banks, it has become common to implement some form of interleaving to more efficiently distribute the data within the memory banks. Thus, for example, each continuous address of memory may be distributed among different memory banks, instead of within a single memory bank. The advantage of such an interleaving scheme is that it may increase memory bandwidth, because it permits the higher speed processor to conduct overlapping memory transactions to the slower speed memory banks via the different memory ports.

To implement an interleaving scheme in a single processor system, certain bits in the address command are selected to identify the memory bank being accessed. Thus, for example, if eight memory banks are available in the system, three of the address bits might be used to identify a specific memory bank. If these three address bits are the low order bits in the address command, then consecutive memory addresses are distributed across the memory banks automatically by the system hardware. In such a system, the address 8000 might correspond to an address location in memory bank 1, while address 8001 might correspond to an address location in memory bank 2. Thus, by using the low order address bits to define the memory bank, the system will interleave data among memory banks as the operating system increments through the address space.

If conversely, the three address bits identifying the memory bank are high order bits (above the bits identifying the virtual page size), then address interleaving typically is performed as part of the software translation from the virtual address to the physical address. Thus, in this type of system, the interleaving is determined by software page placement policy choices typically programmed into the operating system.

In a distributed memory, multi-processor computer system, the memory is distributed throughout the computer system, and is not located in one finite location. In particular, one technique for implementing such a system is to associate memory with each processor in the computer system. Each of the processors within the system may be capable of accessing the memory associated with any other processor by properly transmitting a command coupled with the desired memory address to the appropriate memory location. Identifying an address within any particular memory location requires selecting the processor associated with the memory.

Because memory is distributed throughout the computer system, and multiple processors exist that may each simultaneously seek to access the same memory device or even the same memory data, special steps must be implemented to insure coherency of the data, while still maximizing the speed of memory accesses to minimize system latency. In an attempt to reduce latency (or "waiting") caused by coincident accesses to the same memory location, memory may be distributed within a particular processor sub-system by including multiple memory ports supporting separate memory banks. This adds yet another level of detail that must be identified in the address coding scheme. Thus, in addition to the processor identification, the address command must also identify the memory bank and the memory offset for that particular memory bank.

The conventional technique for addressing memory in a distributed memory computer system is to have the operating system assign continuous address references to contiguous locations on the same processor. Thus, typically the high order bits in the address define the processor, and the lower order bits define the offset in the memory associated with that processor. Thus, as the operating system increments through the address space, the processor being accessed does not change, as the lower order address bits are incremented. Thus, incrementing address space means that the data transactions occur locally on a given processor. Such a situation may be advantageous if the local processor is the source of the data transactions because it reduces the latency of the memory transactions by avoiding the necessity of transmitting commands to another processor to obtain the requested data. In other instances, however, this addressing scheme may be unfavorable. If, for example, multiple processors are referencing the same contiguous piece of memory associated with a different processor, a bottleneck may occur as each requesting processor tries to simultaneously communicate with the processor that controls the targeted memory.

Because the processor identification occurs in the high order bits of the address signal, typically the interleaving of data among processors is performed through software. Thus, in high order interleaving systems that are used with multiple processing systems, the task of distributing addresses is made at a page granularity level by the system software when it determines the virtual-to-physical page translation. Such software implementations, however, require involvement of the processor, and thus may act as a drag on system performance. In addition, simultaneous software interleaving can be very expensive since it requires many operations to convert addresses to a canonical form necessary for the hardware. Software interleaving also can be difficult to implement, and may require additional clock cycles for each memory transaction performed. It would be advantageous to develop a hardware address scheme that permits simultaneous interleaving without the attendant problems caused by software interleaving.

BRIEF SUMMARY OF THE INVENTION

The problems noted above are solved in large part by the system and techniques of the present invention, which permit multiple different address interleavings to be active simultaneously. In particular, unstriped addresses are used to interleave across processors using high order address bits. This allows instructions to be copied locally to all processors in the system, ensuring that all instructions are transmitted with low latency. Striped addresses, conversely, interleave across four processor sets at the low order, and the rest of the processors at high order. This makes a group of four processors the striped local set, with data references distributed to all memory ports of the four processor set. The striping of addresses within a four processor set reduces bottlenecks that may occur when other processors request data associated with memory of a different processor. The simultaneous use of striped and unstriped addresses can improve system performance, without the attendant deficiencies of software implemented systems.

The interleave scheme implemented in the preferred embodiment of the present invention uses an address bit to distinguish between two different types of address interleaving—striped and unstriped. Preferably each processor includes two memory ports, with an entire cache block assigned to a single memory port. In both striped and unstriped interleavings, the lowest order address bits (0–5) indicate the cache alignment, and address bit 6 indicates the port within a processor. The unstriped interleave identifies the cache block within a port in address bits 7–33, and the lower two processor bits in address bits 34 and 35. The striped interleave has the lower two processor bits in address bits 7 and 8, and the cache block in address bits 37–43 (for a system with up to 256 processors, each of which can have 16 GB of memory distributed across 2 ports).

In accordance with the preferred embodiment, the present invention is implemented in hardware. In response to a memory access that results in a cache miss, the hardware converts the address into a single canonical form which has the port, offset, and processor fields in fixed positions. These address bits are then transferred along with bit 36, which comprises the stripe bit, to the port. The port returns the cache block in response. If necessary, the port may re-convert the address into its original form using the stripe bit if it needs to extract the block from another processor's cache. After conversion to the canonical form, the hardware manages the interleaving uniformly for each case by forwarding the reference to the appropriate memory port.

According to the preferred embodiment, the striped interleave is used for data that is more likely to be accessed by other processors, while unstriped interleaves is used for data that is likely to only be accessed by the local processor.

BRIEF DESCRIPTION OF THE DRAWINGS

For a detailed description of the preferred embodiments of the invention, reference will now be made to the accompanying drawings in which:

FIGS. 4a and 4b illustrate exemplary address command signals for an unstriped address interleave and for a striped address interleave, respectively.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. To the extent that any term is not specially defined in this specification, the intent is that the term is to be given it's plain and ordinary meaning.

DETAILED DESCRIPTION OF THE PREFERRED EMBODIMENTS

Figure 1:
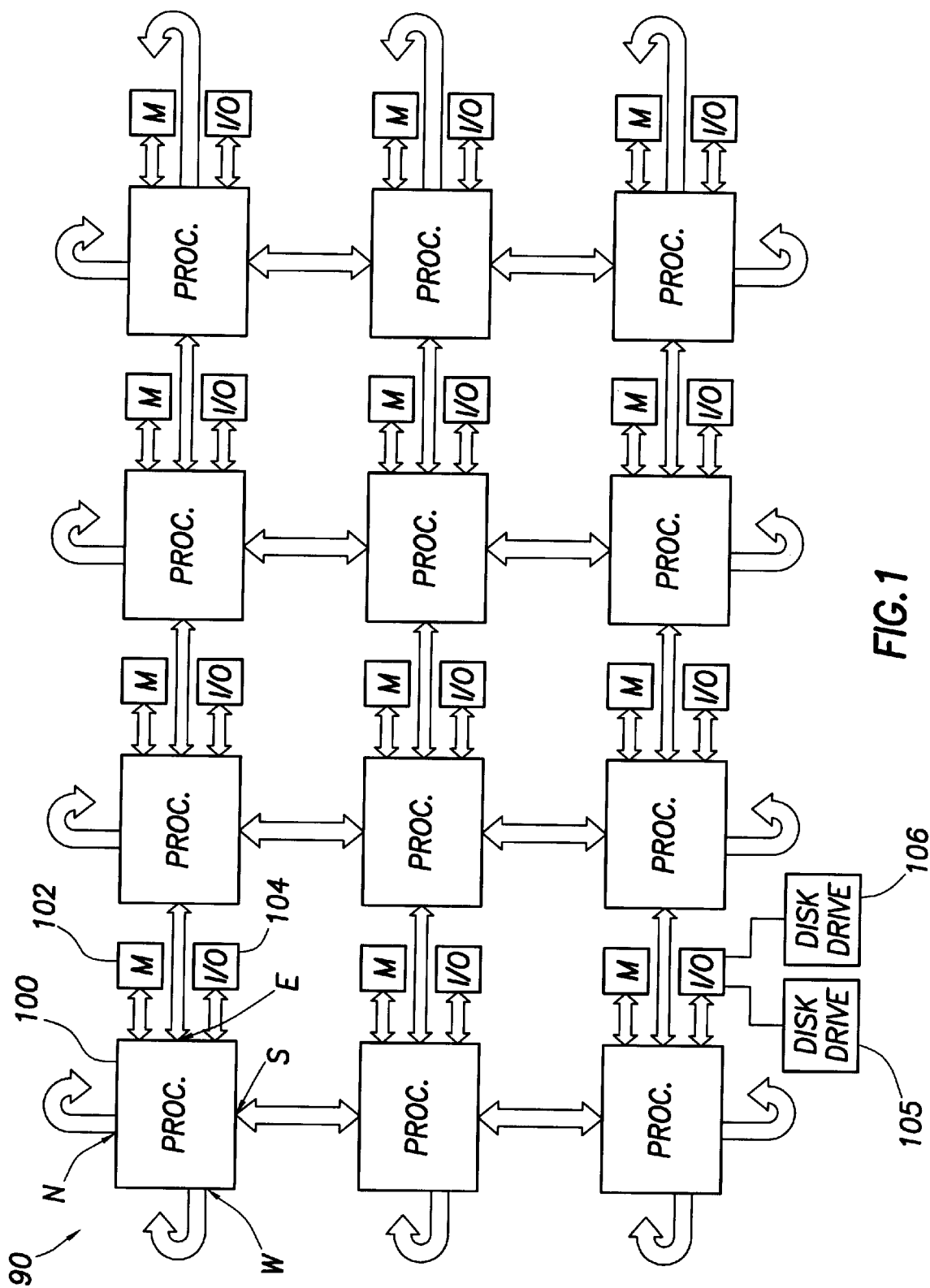
FIG. 1 shows a system level diagram of a multiple processor system coupled together in accordance with the preferred embodiment of the present invention.

Referring now to FIG. 1, in accordance with the preferred embodiment of the invention, computer system 90 comprises one or more processors 100 coupled to a memory sub-system 102 and an input/output ("I/O") controller 104. As shown in FIG. 1, computer system 90 includes multiple processors 100 (twelve such processors are shown for purposes of illustration), with each processor coupled to an associated memory sub-system 102 and an I/O controller 104. Each processor 100 preferably includes four ports for connection to adjacent processors. The inter-processor ports are designated "north," "south," "east," and "west" in accordance with the well-known Manhattan grid architecture. As such, each processor 100 can be connected to four other processors. The processors on both end of the system layout preferably wrap around and connect to processors on the opposite side to implement a 2D torus-type connection. Although twelve processors 100 are shown in the exemplary embodiment of FIG. 1, any desired number of processors can be included. In the preferred embodiment, computer system 90 is designed to accommodate either 256 processors or 128 processors, depending on the size of the memory associated with the processors.

The I/O controller 104 provides an interface to various input/output devices, such as disk drives 105 and 106, as shown in the lower left-hand side of FIG. 1. Data from the I/O devices thus enters the 2D torus via the I/O controllers associated with the various processors. In addition to disk drives, other input/output devices also may be connected to the I/O controllers, including for example, keyboards, mice, CD-ROMs, DVD-ROMs, PCMCIA drives, and the like.

In accordance with the preferred embodiment, the memory 102 preferably comprises RAMbus™ memory devices, but other types of memory devices can be used if desired. The capacity of the memory devices 102 may be of any suitable size. The memory devices 102 preferably are implemented as Rambus Interface Memory Modules ("RIMMS").

In general, computer system 90 can be configured so that any processor 100 can access its own memory 102 and I/O devices as well as the memory and I/O devices of all other processors in the system. Preferably, the computer system may have physical connections between each processor resulting in low interprocessor communication times and improved memory and I/O device access reliability. If physical connections are not present between each pair of processors, a pass-through or bypass path preferably is available for each processor to access the memory and I/O devices of any other processor through one or more intermediary processors, as graphically depicted in FIG. 1.

The processors may be implemented with any suitable microprocessor architecture, although the Alpha processor is used in the preferred embodiment. Therefore, to aid in understanding the preferred embodiment of the present invention, details regarding the preferred processor architecture will be described with reference to FIGS. 2a and 2b, with the understanding that this architecture is not a mandatory requirement to practice the present invention. After discussing the preferred processor architecture with reference to FIGS. 2a and 2b, the present invention will be addressed in further detail with reference to FIGS. 3, 4a and 4b.

Figure 2A:
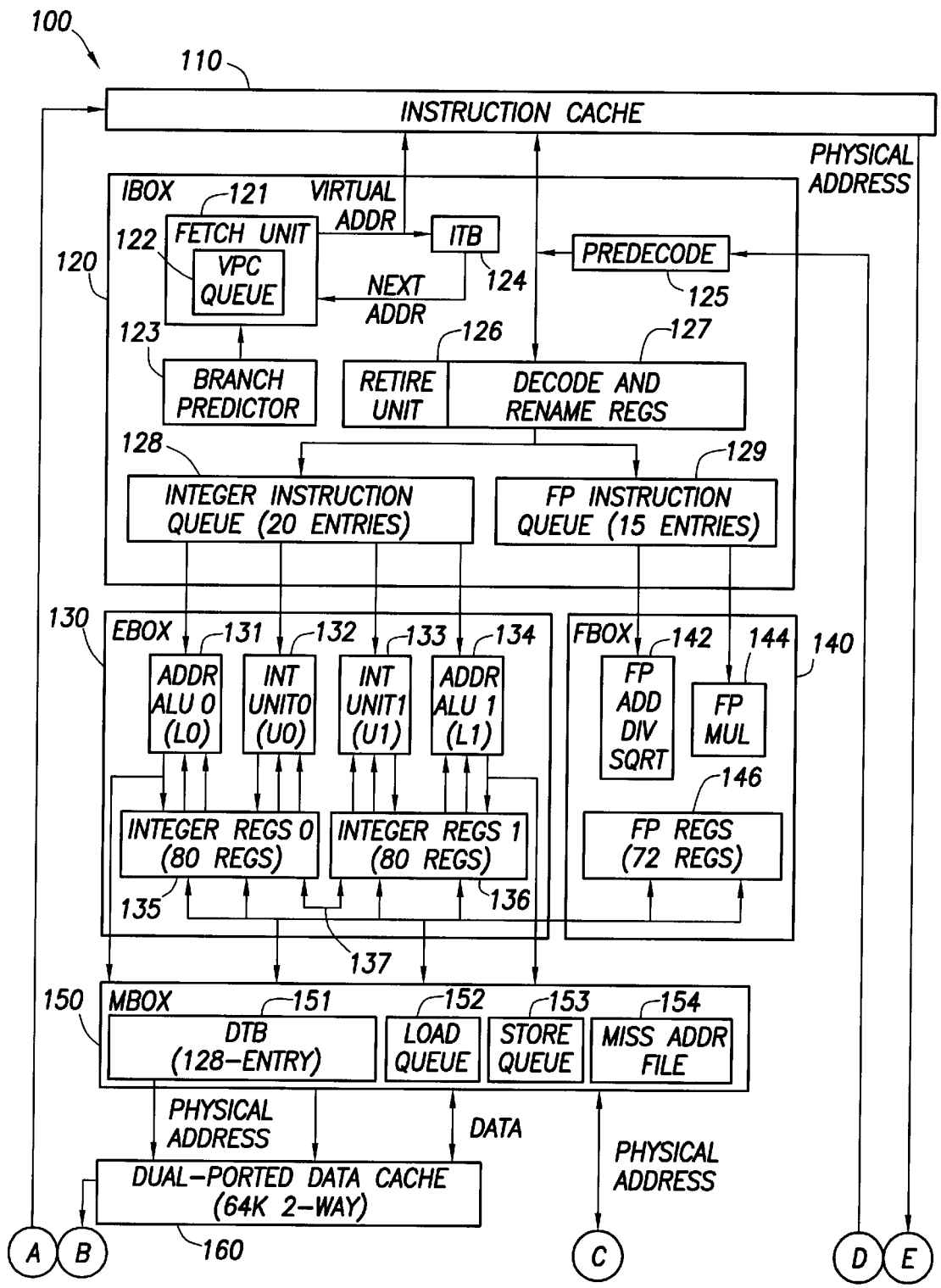
FIGS. 2a and 2b show a block diagram of one of the processors depicted in the preferred embodiment of FIG. 1.
Figure 2B:
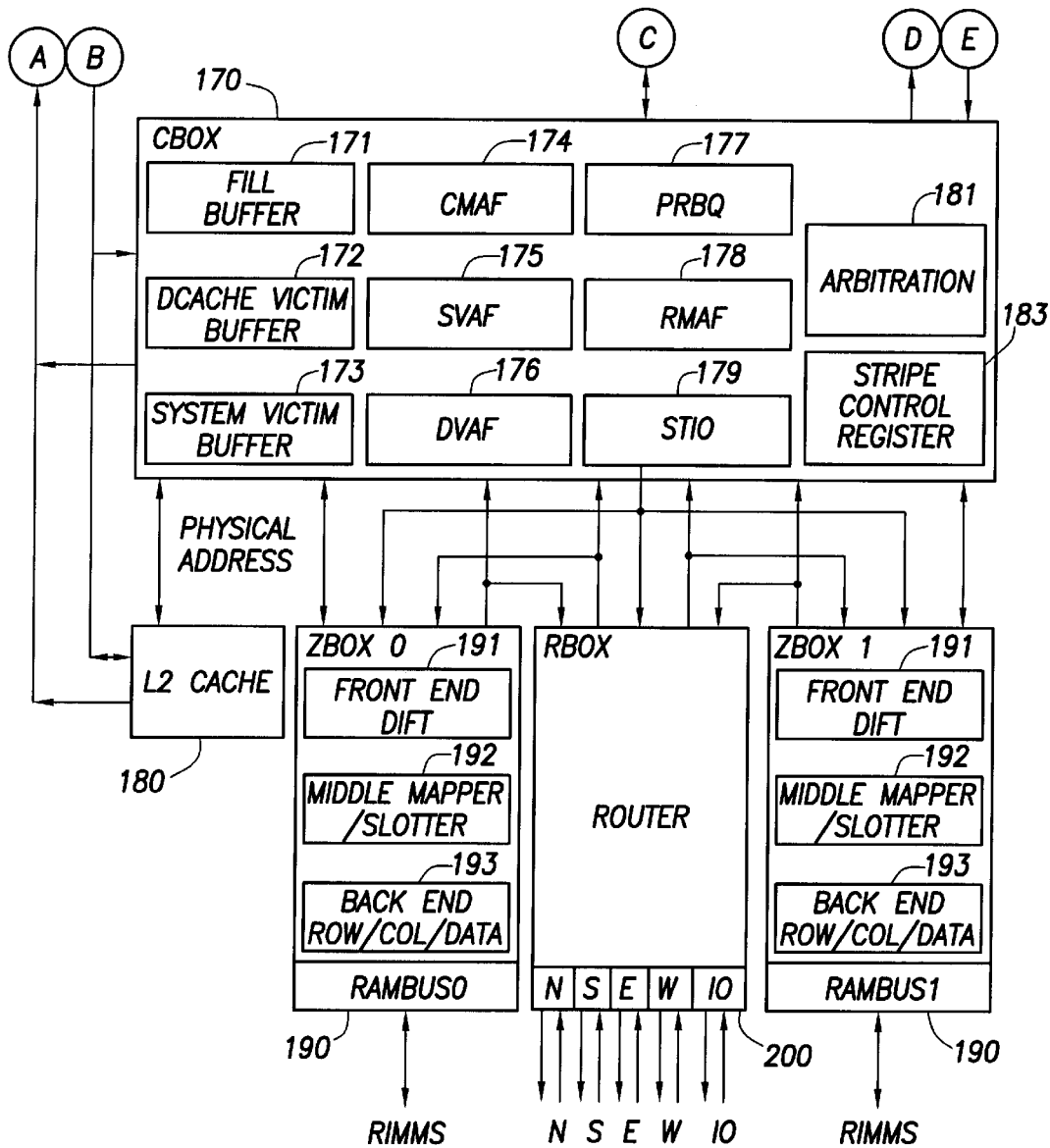

Referring now to FIGS. 2a and 2b, each processor 100 preferably includes an instruction cache 110, an instruction fetch, issue and retire unit ("Ibox") 120, an integer execution unit ("Ebox") 130, a floating-point execution unit ("Fbox") 140, a memory reference unit ("Mbox") 150, a data cache 160, an L2 instruction and data cache control unit ("Cbox") 170, a level L2 cache 180, two memory controllers ("Zbox0" and "Zbox1") 190, and an interprocessor and I/O router unit ("Rbox") 200. The following discussion describes each of these units in more detail.

Each of the various functional units 110–200 contains control logic that communicates with the control logic of other functional units, as shown in FIGS. 2a and 2b. Thus, referring still to FIGS. 2a and 2b, the instruction cache control logic 110 communicates with the Ibox 120, Cbox 170, and L2 Cache 180. In addition to the control logic communicating with the instruction cache 110, the Ibox control logic 120 communicates with Ebox 130, Fbox 140 and Cbox 170. The Ebox 130 and Fbox 140 control logic both communicate with the Mbox 150, which in turn communicates with the data cache 160 and Cbox 170. The Cbox control logic also communicates with the L2 cache 180, Zboxes 190, and Rbox 200.

Referring still to FIGS. 2a and 2b, the Ibox 120 preferably includes a fetch unit 121 which contains a virtual program counter ("VPC") 122, a branch predictor 123, an instruction-stream translation buffer 124, an instruction predecoder 125, a retire unit 126, decode and rename registers 127, an integer instruction queue 128, and a floating point instruction queue 129. Generally, the VPC 122 maintains virtual addresses for instructions that are in-flight. An instruction is said to be "in-flight" from the time it is fetched until it retires or aborts. The Ibox 120 can accommodate as many as 80 instructions, in 20 successive fetch slots, in-flight between the decode and rename registers 127 and the end of the pipeline. The VPC 122 preferably includes a 20-entry queue to store the fetched VPC addresses.

The branch predictor 123 is used by the Ibox 120 for predicting the outcome of branch instructions. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the fetch unit in the processor fetches the branch instruction. In order to keep the pipeline full, which is desirable for efficient operation, the processor preferably includes branch prediction logic that predicts the outcome of a branch instruction before it is actually executed (also referred to as "speculating"). The branch predictor 123, which receives addresses from the VPC queue 122, preferably bases its speculation on short and long-term history of prior instruction branches. As such, using branch prediction logic, the fetch unit can speculate the outcome of a branch instruction before it is actually executed. The speculation, however, may or may not turn out to be accurate. Branch predictor 123 uses any suitable branch prediction algorithm that results in correct speculations more often than misspeculations, enhancing the overall performance of the processor.

The instruction translation buffer ("ITB") 124 couples to the instruction cache 110 and the fetch unit 121. The ITB 124 comprises a 128-entry, fully-associative instruction-stream translation buffer that is used to store recently used instruction-stream address translations and page protection information. Preferably, each of the entries in the ITB 124 may be 1, 8, 64 or 512 contiguous 8-kilobyte ("KB") pages or 1, 32, 512, 8192 contiguous 64-kilobyte pages. The allocation scheme used for the ITB 124 is a round-robin scheme, although other schemes can be used as desired.

The predecode logic 125 reads an octaword (16 contiguous bytes) from the instruction cache 110. Each octaword read from the instruction cache 110 may contain up to four naturally aligned instructions per cycle. Branch prediction and line prediction bits accompany the four instructions fetched by the predecoder 125. The branch prediction scheme implemented in branch predictor 123 generally works most efficiently when only one branch instruction is contained among the four fetched instructions. The predecoder 125 predicts the instruction cache line that the branch predictor 123 will generate. The predecoder 125 generates fetch requests for additional instruction cache lines and stores the instruction stream data in the instruction cache.

Referring still to FIGS. 2*a* and 2*b*, the retire unit 126 fetches instructions in program order, executes them out of order, and then retires (also called "committing" an instruction) them in order. The Ibox 120 logic maintains the architectural state of the processor by retiring an instruction only if all previous instructions have executed without generating exceptions or branch mispredictions. An exception is any event that causes suspension of normal instruction execution. Retiring an instruction commits the processor to any changes that the instruction may have made to the software accessible registers and memory. The processor 100 preferably includes the following three machine code accessible hardware: integer and floating-point registers, memory, and internal processor registers. With respect to the present invention, one of the internal process registers for the Cbox 170 is the Cbox stripe control register (with machine code mnemonic CBOX_STP_CTL).

The decode and rename registers 127 contain logic that forwards instructions to the integer and floating-point instruction queues 128, 129. The decode and rename registers 127 preferably eliminate register write-after-read ("WAR") and write-after-write ("WAW") data dependency while preserving true read-after-write ("RAW") data dependencies. This permits instructions to be dynamically rescheduled. In addition, the decode and rename registers 127 permit the processor to speculatively execute instructions before the control flow preceding those instructions is resolved.

The logic in the decode and rename registers 127 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps. The decode and rename register logic 127 can process four instructions per cycle. Preferably, the logic in the decode and rename registers 127 does not return the physical register, which holds the old value of an instruction's virtual destination register, to the free list until the instruction has been retired, indicating that the control flow up to that instruction has been resolved.

If a branch misprediction or exception occurs, the register logic backs up the contents of the integer and floating-point rename registers to the state associated with the instruction that triggered the condition, and the fetch unit 121 restarts at the appropriate Virtual Program Counter ("VPC"). Preferably, as noted above, 20 valid fetch slots containing up to 80 instructions can be in flight between the registers 127 and the end of the processor's pipeline, where control flow is finally resolved. The register 127 logic is capable of backing up the contents of the registers to the state associated with any of these 80 instructions in a single cycle. The register logic 127 preferably places instructions into the integer or floating-point issue queues 128, 129, from which they are later issued to functional units 130 or 136 for execution.

The integer instruction queue 128 preferably includes capacity for 20 integer instructions. The integer instruction queue 128 issues instructions at a maximum rate of four instructions per cycle. The specific types of instructions processed through queue 128 include: integer operate commands, integer conditional branches, unconditional branches (both displacement and memory formats), integer and floating-point load and store commands, Privileged Architecture Library ("PAL") reserved instructions, integer-to-floating-point and floating-point-integer conversion commands.

Referring still to FIGS. 2*a* and 2*b*, the integer execution unit (Ebox) 130 includes arithmetic logic units ("ALUs") 131, 132, 133, and 134 and two integer register files 135. Ebox 130 preferably comprises a 4-path integer execution unit that is implemented as two functional-unit "clusters" labeled 0 and 1. Each cluster contains a copy of an 80-entry, physical-register file and two subclusters, named upper ("U") and lower ("L"). As such, the subclusters 131–134 are labeled U0, L0, U1, and L1. Bus 137 provides cross-cluster communication for moving integer result values between the clusters.

The subclusters 131–134 include various components that are not specifically shown in FIG. 2*a*. For example, the subclusters preferably include four 64-bit adders that are used to calculate results for integer add instructions, logic units, barrel shifters and associated byte logic, conditional branch logic, a pipelined multiplier for integer multiply operations, and other components known to those of ordinary skill in the art.

Each entry in the integer instruction queue 128 preferably asserts four request signals—one for each of the Ebox 130 subclusters 131, 132, 133, and 134. A queue entry asserts a request when it contains an instruction that can be executed by the subcluster, if the instruction's operand register values are available within the subdluster. The integer instruction queue 128 includes two arbiters—one for the upper subclusters 132 and 133 and another arbiter for the lower subclusters 131 and 134. Each arbiter selects two of the possible 20 requesters for service each cycle. Preferably, the integer instruction queue 128 arbiters choose between simultaneous requesters of a subcluster based on the age of the request—older requests are given priority over newer requests. If a given instruction requests both lower subclusters, and no older instruction requests a lower subcluster, then the arbiter preferably assigns subcluster 131 to the instruction. If a given instuction requests both upper subclusters, and no older instruction requests an upper subcluster, then the arbiter preferably assigns subcluster 133 to the instruction.

The floating-point instruction queue 129 preferably comprises a 15-entry queue and issues the following types of instructions: floating-point operates, floating-point conditional branches, floating-point stores, and floating-point register to integer register transfers. Each queue entry preferably includes three request lines—one for the add pipeline, one for the multiply pipeline, and one for the two store pipelines. The floating-point instruction queue 129 includes three arbiters—one for each of the add, multiply, and store pipelines. The add and multiply arbiters select one requester per cycle, while the store pipeline arbiter selects two requesters per cycle, one for each store pipeline. As with the integer instruction queue 128 arbiters, the floating-point instruction queue arbiters select between simultaneous requesters of a pipeline based on the age of the request—older request are given priority. Preferably, floating-point store instructions and floating-point register to integer register transfer instructions in even numbered queue entries arbitrate for one store port. Floating-point store instructions and floating-point register to integer register transfer instructions in odd numbered queue entries arbitrate for the second store port.

Floating-point store instructions and floating-point register to integer register transfer instructions are queued in both the integer and floating-point queues. These instructions wait in the floating-point queue until their operand register values are available from the floating-point execution unit ("Fbox") registers. The instructions subsequently request service from the store arbiter. Upon being issued from the floating-point queue 129, the instructions signal the corresponding entry in the integer queue 128 to request service. Finally, upon being issued from the integer queue 128, the operation is completed.

The integer registers 135, 136 preferably contain storage for the processor's integer registers, results written by instructions that have not yet been retired, and other information as desired. The two register files 135, 136 preferably contain identical values. Each register file preferably includes four read ports and six write ports. The four read ports are used to source operands to each of the two subclusters within a cluster. The six write ports are used to write results generated within the cluster or another cluster and to write results from load instructions.

The floating-point execution queue ("Fbox") 129 contains a floating-point add, divide and square-root calculation unit 142, a floating-point multiply unit 144 and a register file 146. Floating-point add, divide and square root operations are handled by the floating-point add, divide and square root calculation unit 142 while floating-point operations are handled by the multiply unit 144.

The register file 146 preferably provides storage for 72 entries including 31 floating-point registers and 41 values written by instructions that have not yet been retired. The Fbox register file 146 contains six read ports and four write ports (not specifically shown). Four read ports are used to source operands to the add and multiply pipelines, and two read ports are used to source data for store instructions. Two write ports are used to write results generated by the add and multiply pipelines, and two write ports are used to write results from floating-point load instructions.

Referring still to FIG. 2a, the Mbox 150 controls the L1 data cache 160 and ensures architecturally correct behavior for load and store instructions. The Mbox 150 preferably contains a datastream translation buffer ("DTB") 151, a load queue ("LQ") 152, a store queue ("SQ") 153, and a miss address file ("MAF") 154. The DTB 151 preferably comprises a fully associative translation buffer that is used to store data stream address translations and page protection information. Each of the entries in the DTB 151 can map 1, 8, 64, or 512 contiguous 8-KB pages. The allocation scheme preferably is round robin, although other suitable schemes could also be used. The DTB 151 also supports an 8-bit Address Space Number ("ASN") and contains an Address Space Match ("ASM") bit. The ASN is an optionally implemented register used to reduce the need for invalidation of cached address translations for process-specific addresses when a context switch occurs.

The LQ 152 preferably comprises a reorder buffer used for load instructions. It contains 32 entries and maintains the state associated with load instructions that have been issued to the Mbox 150, but for which results have not been delivered to the processor and the instructions retired. The Mbox 150 assigns load instructions to LQ slots based on the order in which they were fetched from the instruction cache 110, and then places them into the LQ 152 after they are issued by the integer instruction queue 128. The LQ 152 also helps to ensure correct memory reference behavior for the processor.

The SQ 153 preferably is a reorder buffer and graduation unit for store instructions. It contains 32 entries and maintains the state associated with store instructions that have been issued to the Mbox 150, but for which data has not been written to the data cache 160. The Mbox 150 assigns store instructions to SQ slots based on the order in which they were fetched from the instruction cache 110 and places them into the SQ 153 after they are issued by the instruction cache 110. The SQ 153 holds data associated with the store instructions issued from the integer instruction unit 128 until they are retired, at which point the store can be allowed to update the data cache 160. The LQ 152 also helps to ensure correct memory reference behavior for the processor.

The MAF 154 preferably comprises a 16-entry file that holds physical addresses associated with pending instruction cache 110 and data cache 160 fill requests and pending input/output ("I/O") space read transactions.

Processor 100 preferably includes two on-chip primary-level ("L1") instruction and data caches 110 and 160, and a single secondary-level, unified instruction/data ("L2") cache 180 (FIG. 2b). The L1 instruction cache 110 preferably comprises a 64-KB virtual-addressed, two-way set-associative cache. Prediction logic improves the performance of the two-way set-associative cache without slowing the cache access time. Each instruction cache block preferably contains a plurality (preferably 16) instructions, virtual tag bits, an address space number, an address space match bit, a one-bit PALcode bit to indicate physical addressing, a valid bit, data and tag parity bits, four access-check bits, and predecoded information to assist with instruction processing and fetch control.

The L1 data cache 160 preferably comprises a 64 KB, two-way set associative, virtually indexed, physically tagged, write-back, read/write allocate cache with 64-byte cache blocks. During each cycle the data cache 160 preferably performs one of the following transactions: two quadword (or shorter) read transactions to arbitrary addresses, two quadword write transactions to the same aligned octaword, two non-overlapping less-than quadword writes to the same aligned quadword, one sequential read and write transaction from and to the same aligned octaword. Preferably, each data cache block contains 64 data bytes and associated quadword ECC bits, physical tag bits, valid, dirty, shared, and modified bits, tag parity bit calculated across the tag, dirty, shared, and modified bits, and one bit to control round-robin set allocation. The data cache 160 is organized to contain two sets, each with 512 rows containing 64-byte blocks per row (i.e., 32-KB of data per set). The processor 100 uses two additional bits of virtual address beyond the bits that specify an 8-KB page in order to specify the data cache row index. A given virtual address might be found in four unique locations in the data cache 160, depending on the virtual-to-physical translation for those two bits. The processor 100 prevents this aliasing by keeping only one of the four possible translated addresses in the cache at any time.

The L2 cache 180 preferably comprises a 1.75-MB, seven-way set associative write-back mixed instruction and data cache. Preferably, the L2 cache holds physical address data and coherence state bits for each block.

Referring now to FIG. 2b, the L2 instruction and data cache control unit ("Cbox") 170 controls the L2 instruction and data cache 190 and system ports. As shown, the Cbox 170 contains a fill buffer 171, a data cache victim buffer 172, a system victim buffer 173, a cache miss address file ("CMAF") 174, a system victim address file ("SVAF") 175, a data victim address file ("DVAF") 176, a probe queue ("PRBQ") 177, a requester miss-address file ("RMAF") 178, a store to I/O space ("STIO") 179, and an arbitration unit 181. In addition, the Cbox 170 also preferably includes a stripe control register 183 that functions as a mask for memory blocks in the associated memory, indicating whether each memory block may be accessed with striped addressing techniques, as disclosed herein.

The fill buffer 171 preferably buffers data received from other functional units external to the Cbox. The data and instructions are written into the fill buffer 171, and other logic units in the Cbox process the data and instructions before relaying to other fuinctional units or the L1 cache. The data cache victim buffer ("VDF") 172 preferably stores data flushed from the L1 cache or sent: to the System Victim Data Buffer 173. The System Victim Data Buffer ("SVDB") 173 is used to send data flushed from the L2 cache to other processors in the system and to memory. Cbox Miss-Address File ("CMAF") 174 preferably holds addresses of any transaction that results in an L1 cache miss. CMAF updates and maintains the status of these addresses. The System Victim-Address File ("SVAF") 175 in the Cbox preferably contains the addresses of all SVDB data entries. The Data Victim-Address File ("DVAF") 176 preferably contains the addresses of all data cache victim buffer ("VDF") data entries.

The Probe Queue ("PRBQ") 177 preferably comprises an 18-entry queue that holds pending system port cache probe commands and addresses. This queue includes 10 remote request entries, 8 forward entries, and lookup L2 tags and requests from the PRBQ content addressable memory ("CAM") against the RMAF, CMAF and SVAF. Requestor Miss-Address Files ("RMAF") 178 in the Cbox preferably accepts requests and responds with data or instructions from the L2 cache. Data accesses from other functional units in the processor, other processors in the computer system or any other devices that might need data out of the L2 cache are sent to the RMAF for service. The Store Input/Output ("STIO") 179 preferably transfer data from the local processor to I/O cards in the computer system. Finally, arbitration unit 181 in the Cbox preferably arbitrates between load and store accesses to the same memory location of the L2 cache and informs other logic blocks in the Cbox and other computer system functional units of any conflict.

The stripe control register 183 preferably comprises a 64 bit register that serves as a mask representing memory blocks in the memory sub-system associated with each processor. Each bit in the stripe control register 183 represents either 256 MB or 512 MB of memory. Thus, the full 64 bits represent the maximum 16 GB or 32 GB of memory associated with a particular processor. If the corresponding mask bit is clear, the memory block must be addressed without striping, using processor contiguous addressing. Conversely, if the corresponding mask bit is set, the memory block must be referenced with address striping. The determination of whether a memory block must be addressed by striping may be made in many ways, as will be apparent to one skilled in the art. In the preferred embodiment, this determination is based on whether the data stored in the memory block will be accessed solely by the local processor, or whether other processors also may access the data block. This determination may be historically based, depending on the prior access history of similar type data. Other predictive logic also may be used, if desired, to set or clear the corresponding mask bit for a memory block.

The stripe control register may preferably be used to enable the associated computer to issue references to a memory location even though the location does not exist. Such a memory reference may be referred to as a non-existent memory reference ("NXM"). In the preferred embodiment, a correctly functioning processor may generate NXMs during normal operation because it can create speculative memory references. If a processor was not permitted to generate speculative memory references, then the software could be used to insure that only correct addresses were used. If one were to consider a memory location A in ("DRAM") memory, this location could be referenced when a processor used either the address A' (unstriped) or A" (striped). Only one of A' and A" are valid addresses. The stripe control register 183 guarantees that only one of A' and A" exist at the same time. If A' is the legitimate address, then any reference to A using the A" address will be a NXM reference—the reference is nulled and the address A" is not allowed to be loaded into the cache.

Referring still to FIG. 2b, processor 100 preferably includes dual, integrated RAMbus memory controllers 190 (identified as Zbox0 and Zbox1). Thus, each processor preferably includes two memory ports (referred to herein as port 0 and port 1). Each Zbox controller 190 controls 4 or 5 channels of information flow with the main memory 102 (FIG. 1). Each Zbox preferably includes a front-end directory in-flight table ("DIFT") 191, a middle mapper 192, and a back end 193. The front-end DIFT 191 performs a number of functions such as managing the processor's directory-based memory coherency protocol, processing request commands from the Cbox 170 and Rbox 200, sending forward commands to the Rbox, sending response commands to and receiving packets from the Cbox and Rbox, and tracking up to 32 in-flight transactions. The front-end DIFT 191 also sends directory read and write requests to the Zbox and conditionally updates directory information based on request type, Local Probe Response ("LPR") status and directory state.

The middle mapper 192 maps the physical address into RAMbus device format by device, bank, row, and column. The middle mapper 192 also maintains an open-page table to track all open pages and to close pages on demand if bank conflicts arise. The mapper 192 also schedules RAMbus transactions such as timer-base request queues. The Zbox back end 193 preferably packetizes the address, control, and data into RAMbus format and provides the electrical interface to the RAMbus devices themselves.

The Rbox 200 provides the interfaces to as many as four other processors and one I/O controller 104 (FIG. 1). The inter-processor interfaces are designated as North ("N"), South ("S"), East ("E"), and West ("W") and provide two-way communication between adjacent processors.

According to the preferred embodiment, the present invention includes the capability of striping data across a local set of processors, or of using processor contiguous addressing, depending on the status of the mask bits in the Cbox stripe control register 183. Thus, if the mask bit is set in stripe control register 183 for a memory block, references to that memory block must implement stripe addressing. Consequently, the present invention supports the ability to perform both striped addressing among a local processor set, and the ability to perform convention processor contiguous addressing within the memory block of a particular processor.

In the preferred embodiment, the address command signal used for striped memory addressing differs from that used for processor contiguous addressing. Referring now to FIGS. 4a and 4b, the core address space preferably comprises 44 physical bits. The most significant bit, bit 43, selects between I/O space and memory cacheable space. The 44 bit address space supports up to 256 processors and 256 I/O ASICs configured with up to 16 GB of associated memory. Larger memory sizes are also possible (such as 32 GB), by proportionally reducing the number of processors that are supported.

The memory address space preferably is defined as a processor-contiguous address or a striped address based on the status of stripe bit 36. Thus, a given memory block may be accessed using either processor-contiguous or striped addressing, though preferably only one addressing mechanism is used at any given time to access a particular memory block. The stripe bit 36 must be carried with the physical address offset so that conversion between a core address and a network address can be performed, as required.

Referring now particularly to FIG. 4A (and assuming 256 processors with 16 GB of memory storage capability per processor), bit 43 is set to zero to indicate a memory-cacheable address. The particular processor being accessed is identified by the processor identification ("PID") bits 7:0. The eight processor identification provide bits provide identification of which of the 256 different processors is selected for a given memory access. Bits 42–37 of the address space: identify the upper six bits (PID bits 7:2) of the processor identification number where the memory access is targeted. For processor contiguous addressing, the lower two bits of the processor identification number (PID bits 1:0) are located in bits 35–34 of the address space. Positioned between the lower and upper PID bits is the stripe bit, which comprises bit 36 of the address space. In the case of processor-contiguous memory space addressing, bit 36 is set to "0", as shown in FIG. 4a. Bits 33–0, which support up to 16 GB of memory per processor, determine the memory offset at the targeted processor. If larger memory sizes are desired on a per processor basis, then bit 42 may be used as another memory offset bit, instead of as a processor ID bit, thus limiting the number of processors supported to 128. As shown in FIG. 4a, bits 5–0 specify the offset within the cache block, and bit 6 preferably represents the port bit identifying the memory port being addressed.

Referring now to FIG. 4b, the striped memory space also is partitioned with bit 43 identifying a memory cacheable address (with a logic "0") or an I/O access, and bits 43–37 specifying the upper six bits of the processor ID (PID 7:2). Bit 36, which is the stripe bit, is set to "1" to indicate a striped memory address. Address space bits 35–9 and 6–0 identify the memory offset within the selected processor, thereby supporting up to 16 GB of memory per processor. For striped addressing, address bits 7–8 identify the lower two bits of the processor ID (PID 1:0). In addition, in accordance with the preferred embodiment, bit 6 identifies the memory port of the processor. Bits 5–0 identify the low order address offset at that processor. If a larger memory size is desired, then bit 42 may be used as a high order offset bit instead of as a processor ID bit. In the preferred embodiment, striping is only allowed or disallowed in blocks or chunks of memory. Thus, according to the preferred embodiment, striping is determined with a 256 MB granularity in 16 GB per processor configurations. In 32 GB per processor configurations, striping can only be allowed or disallowed with a granularity of 512 MB.

The present invention includes the capability to select between processor-contiguous addressing and striping based upon the type of data and instructions to be stored in memory. Some applications have instruction streams and data structures that are only used by a single processor. Storing in contiguous memory space reduces memory latency for that data when accessed by the local processor exclusively. Striped addressing, conversely, makes memory latency more uniform for data and instructions that are used by more than one processor, because it permits portions of the data to be retrieved from different processors.

When processor contiguous addressing is used, data and instructions are stored within the memory of a single processor, in accordance with normal convention. In the preferred embodiment, the processor contiguous memory space ranges are pre-assigned based on the following Table I.

TABLE I

| PROCESSOR # | PID | LOWER RANGE | UPPER RANGE |
|---|---|---|---|
| 0 | 0000000 | 000.0000.0000 | 003.FFFF.FFFF |
| 1 | 0000001 | 004.0000.0000 | 007.FFFF.FFFF |
| 2 | 0000010 | 008.0000.0000 | 00B.FFFF.FFFF |
| 3 | 0000011 | 00C.0000.0000 | 00F.FFFF.FFFF |
| 4 | 0000100 | 020.0000.0000 | 023.FFFF.FFFF |
| 5 | 0000101 | 024.0000.0000 | 027.FFFF.FFFF |
| 6 | 0000110 | 028.0000.0000 | 02b.FFFF.FFFF |

TABLE I-continued

| PROCESSOR # | PID | LOWER RANGE | UPPER RANGE |
| --- | --- | --- | --- |
| 7 | 0000111 | 02C.0000.0000 | 02F.FFFF.FFFF |
| * | * | * | * |
| 127 | 1111111 | 3EC.0000.0000 | 3EF.FFFF.FFFF |

The striped memory space ranges preferably are pre-assigned based on the following Table II.

TABLE II

| PROCESSOR # | PID | LOWER RANGE | UPPER RANGE |
| --- | --- | --- | --- |
| 0–3 | 0000000–0000011 | 010.0000.0000 | 01F.FFFF.FFFF |
| 4–7 | 0000100–0000111 | 030.0000.0000 | 03F.FFFF.FFFF |
| 8–11 | 0001000–0000111 | 050.0000.0000 | 05F.FFFF.FFFF |
| 12–15 | 0001000–0001111 | 070.0000.0000 | 07F.FFFF.FFFF |
| 16–19 | 001000–0010011 | 090.0000.0000 | 09F.FFFF.FFFF |
| 20–23 | 0010100–0010111 | 0B0.0000.0000 | 0BF.FFFF.FFFF |
| 24–27 | 0011000–0011011 | 0D0.0000.0000 | 0DF.FFFF.FFFF |
| 28–31 | 0011100–0011111 | 0F0.0000.0000 | 0FF.FFFF.FFFF |
| * | * | * | * |
| 124–127 | 1111100–1111111 | 3F0.0000.0000 | 3FF.FFFF.FFFF |

Figure 3:
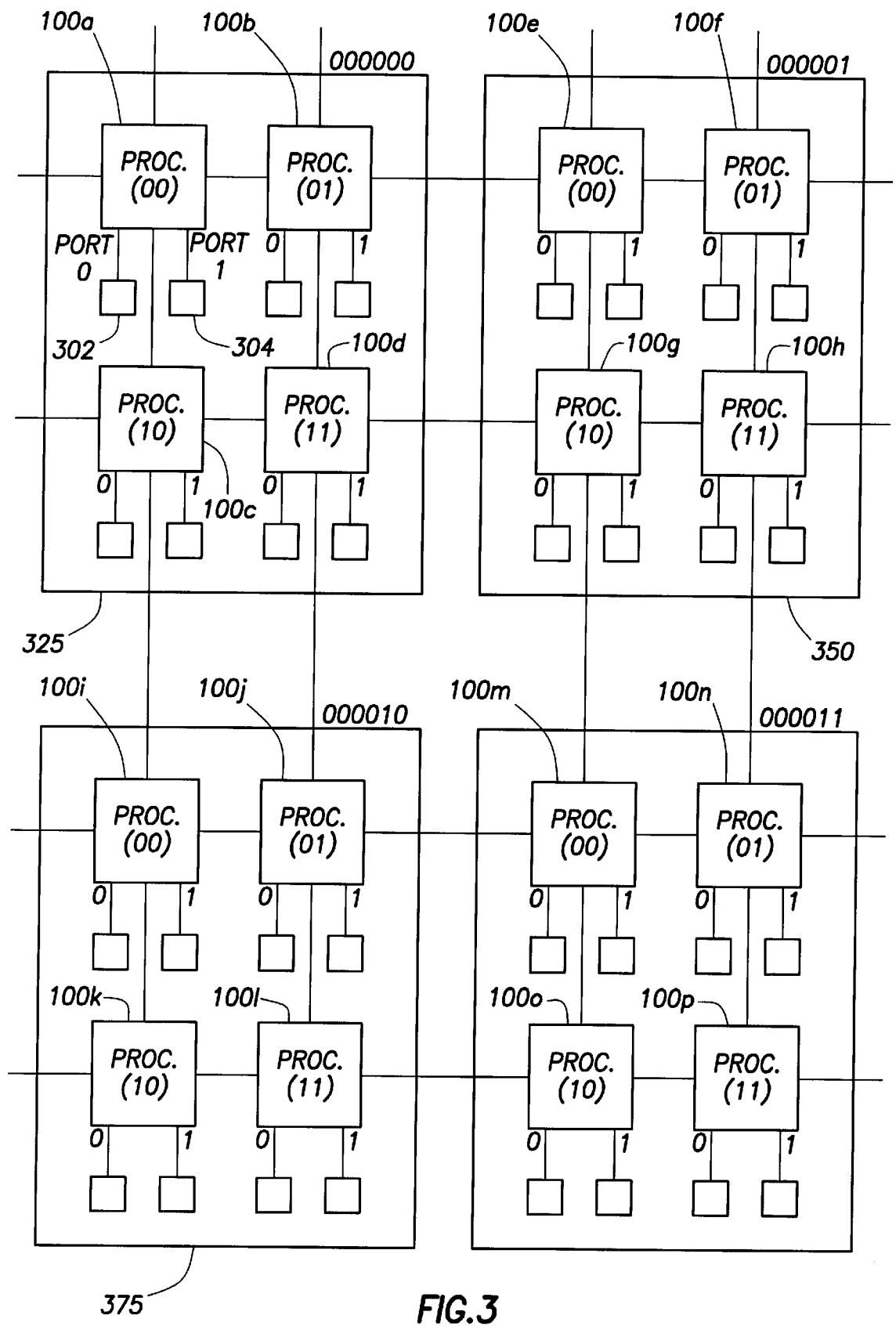
FIG. 3 shows sixteen processors, with associated memory ports, grouped into four local striped sets in accordance with an exemplary embodiment of the present invention.

Referring now to FIG. 3, a portion of an exemplary multiple processor computer system is shown with 16 processors that are identified as 100a–100p. Each processor preferably includes two memory ports (port 0 and port 1) which connect to two memory banks 302, 304. According to one exemplary embodiment, one of the two ports may be configured with cache memory, while the other comprises standard DRAM memory. Also, as noted above, address space bit 6 identifies the port being addressed for a given processor.

As shown in FIGS. 3 and 4b, the processors are split into local striped sets based upon processor identification numbers. Thus, the local striped processor set 325 comprises all that have the PID bits 000000xx. Put differently, local striped set comprises all processors with the first six PID bits of 000000. As shown in FIG. 3, these six bits would be represented in address space bits 42–37. The last two PID bits, which are found in address space bits 8–7, identify which of the four processors is referenced. Thus, if the last two PID bits are 00, that indicates that processor 100a is targeted (for a complete PID of 00000000). Similarly, the last two PID bits of processor 100b are 01, while processors 100c and 100d have the last two PID bits of 10 and 11.

The second local striped processor set 350 are those processors 100e–100h with the first six PID bits of 000001 in address space bits 42–37. The specific processor 100e–100h is identified by the four possible bit combinations present in address space bits 7–8, which are the two least significant PID bits. To further continue the example, the third local striped processor set 375 are processors 100i–100l with the first six PID bits of 000010 in address space bits 42–37. The specific processor 100i–100l is identified by the four possible bit combinations present in address space bits 7–8, which are the two least significant PID bits.

Because the lower two PID bits are identified in the low order bits of the address space for striped addressing, incrementing of addresses causes the data to be striped between the four processors in the local striped processor set. Thus, as data or instructions are stored, the operating system will increment the value in the address space. If striped addressing is indicated, this process automatically causes the data to be stored in an interleave fashion among the local four processor set. This then permits the data to be accessed in parallel from the four processors.

It should be understood that the local striped processor sets does not necessarily mean that these sets can only be referenced by striped addressing. As indicated above, in the preferred embodiment either striped or processor contiguous addressing may be used for all system memory. The determination of whether to use striped addressing for a memory block preferably is based on the mask in the stripe control register 183 (FIG. 2b).

Moreover, it should also be understood that the system is capable of translating between processor contiguous addressing and striped addressing, as required. In addition, a special addressing command may be used to transfer data requests between processors. Thus, in the preferred embodiment, a source processor identifies the memory block it needs, and sends a request in canonical form to the local processor that is acting as the memory controller for that data. If the data is stored in striped form (as indicated by the mask in the Cbox stripe control register), local processor must translate the canonical form of the address to the striped address to retrieve the requested data. Moreover, the address may need to be relayed to another processor that has the data in its cache, in which case the address must be re-converted back to canonical form for sending to the other processor who has what may be a dirty copy of the data in its cache.

The above discussion is meant to be illustrative of the principles and various embodiments of the present invention. Numerous variations and modifications will become apparent to those skilled in the art once the above disclosure is fully appreciated. Thus, for example, although only two addressing schemes are disclosed in the preferred embodiment (which are striped and processor contiguous addressing), other addressing schemes may also be used simultaneously in addition to or as an alternative to these two addressing schemes. To implement addition addressing schemes, more than one bit would be used for the stripe bit. Thus, for example, if two bits were dedicated to the address type, four addressing schemes could be used simultaneously. In addition, the bit field positions and widths of the addressing space could be varied for each addressing scheme without departing from the principles of the present invention. It is intended that the following claims be interpreted to embrace all such variations and modifications.

What is claimed is:

1. A computer system, comprising:
    a plurality of processors that are coupled together;
    a memory associated with each of said plurality of processors, wherein each of said plurality of processors is capable of accessing the memory associated with any other processor;
    wherein, in accordance with a stripe bit in an address signal, data is stored in any of the memories associated with said plurality of processors on either a processor contiguous basis, or by striping across multiple processors in a stripe set; and
    wherein said address signal includes a field when striping across processors, said field includes a first sub-field that specifies the processors that comprise a stripe set and a second sub-field that specifies the number of processors in the stripe set.

2. The computer system of claim 1, wherein memory is accessed using address command signals whose coding differs depending on whether memory is stored on a processor contiguous basis or a striped basis.

3. The computer system of claim 2, wherein the address command signal includes a processor identification bit field that identifies the target of a memory access and contains the first and second sub-fields.

4. The computer system of claim 3, wherein the processor identification bit field includes n bits identifying $2^n$ processors, and a portion of said n bits is located in low order address space for a striped memory access.

5. The computer system of claim 4, wherein said low order address space resides in the lower two bytes of address space.

6. The computer system of claim 5, wherein said low order address space resides in the lowest byte of address space.

7. The computer system as in claim 4, wherein said portion of said n bits comprises two bits to identify a four processor striped set across which data is striped.

8. The computer system of claim 4, wherein said address command signal includes bits representing a memory offset, and said low order space resides in bits that are less significant than at least a portion of the memory offset bits.

9. The computer system of claim 1, wherein at least one of said plurality of said processors includes a first and second memory port, and said memory associated with said at least one processor comprises a first memory sub-system and a second memory sub-system, which are respectively coupled to said first and second memory port.

10. The computer system as in claim 9, wherein said first memory sub-system comprises DRAM memory, and said second memory sub-system comprises cache memory.

11. The computer system as in claim 10, wherein said at least one of said plurality of said processors includes an associated memory controller for each memory port.

12. The computer system as in claim 1, wherein said plurality of said processors include a memory controller that interfaces said processor to said associated memory.

13. The computer system of claim 1, wherein said plurality of said processors include a stripe control register that includes a mask for identifying which memory blocks are to be accessed with striped addressing and which memory blocks are to be accessed with processor contiguous addressing.

14. The computer system of claim 13, wherein said stripe control register comprises an internal processor register.

15. The computer system of claim 4, wherein the processor identification bit field includes n bits identifying $2^n$ processors, and said n bits are located in high order address space for a processor contiguous address.

16. The computer system of claim 1, where data includes instructions.

17. The computer system of claim 1, wherein said processors are grouped into local stripe sets based upon the lowermost bits in a processor identification bit field.

18. The computer system of claim 17, wherein said local stripe sets includes four processors that are determined by the two lowermost bits in said processor identification field.

19. The computer system of claim 1, wherein memory accesses using striped addressing and memory accesses using processor contiguous addressing occur simultaneously in said computer system.

20. A computer system, comprising:
a plurality of processors that are coupled together;
a memory associated with each of said plurality of processors, wherein each of said plurality of processors is capable of accessing the memory associated with any other processor on either a processor contiguous basis, or on a stripe basis across multiple processors in a stripe set; and
an I/O controller, associated with each of said plurality of processors, capable of interfacing with I/O devices, wherein each of said plurality of processors is capable of accessing I/O devices associated with any other processor;
wherein, in accordance with a stripe bit in an address command signal, data is stored in any of the memories associated with said plurality of processors on either a processor contiguous basis, or by striping across multiple processors in a stripe set; and
wherein said address command signal includes a field when striping across processors, said field includes a first sub-field that specifies the processors that comprise a stripe set and a second sub-field that specifies the number of processors in the stripe set.

21. The computer system of claim 20, wherein memory accesses include an address command signal that differs depending on whether memory is accessed on a processor contiguous basis or a striped basis, and the address command signal includes a processor identification bit field that identifies the target of a memory access and which includes said first and second sub-fields.

22. The computer system of claim 21, wherein the processor identification bit field for a stripe memory access includes n bits identifying $2^n$ processors, and wherein said first sub-field is located in high order address space, and said second sub-field is located in low order address space.

23. A computer system, comprising:
a plurality of processors that are coupled together;
a memory associated with each of said plurality of processors, wherein each of said plurality of processors is capable of accessing the memory associated with any other processor on either a processor contiguous basis, or on a stripe basis across multiple processors in a stripe set; and
an I/O controller, associated with each of said plurality of processors, capable of interfacing with I/O devices, wherein each of said plurality of processors is capable of accessing I/O devices associated with any other processor;
wherein memory accesses include an address command signal that differs depending on whether memory is accessed on a processor contiguous basis or a striped basis, and the address command signal includes a processor identification bit field that identifies the target of a memory access;
wherein the address command signal includes a stripe bit that indicates if the address command signal is a striped memory access or a processor contiguous memory access;
wherein the processor identification bit field for a stripe memory access includes n bits identifying $2^n$ processors, and said processor identification bit field includes a first portion y and a second portion x, and wherein said first portion y is located in high order address space, and said second portion x is located in low order address space; and
wherein the first portion y includes a bit field that defines the processors that comprise the stripe set, and the second portion x includes a bit field that defines the number of processors in said stripe set.

24. The computer system of claim 23, wherein said low order address space resides in the lowest byte of address space and said high order space resides in the highest byte of address space.

25. The computer system as in claim 24, wherein said processor identification bit field a comprises at least seven bits, and the second portion x comprises two bits identifying four processors within each stripe set.

26. The computer system of claim 21, wherein the address command signal includes a bit that identifies if an access targets memory or an I/O controller.

27. The computer system as in claim 20, wherein said plurality of said processors include a memory controller that interfaces said processor to said associated memory.

28. The computer system of claim 27, wherein said memory controller includes a stripe control register that includes a mask for identifying which memory blocks in said associated memory are to be accessed with striped addressing and which memory blocks in said associated memory are to be accessed with processor contiguous addressing.

29. The computer system of claim 20, wherein memory accesses using striped addressing and memory accesses using processor contiguous addressing occur simultaneously in said computer system to different memory blocks.

* * * * *